US012359599B2

(12) United States Patent
Giachino et al.

(10) Patent No.: US 12,359,599 B2
(45) Date of Patent: Jul. 15, 2025

(54) UREA SENDER UNIT

(71) Applicant: ERRENCINQUE S.R.L., Mappano (IT)

(72) Inventors: Massimo Giachino, Mappano (IT); Fabrizio Ciccarelli, Mappano (IT)

(73) Assignee: ERRENCINQUE S.R.L., Mappano (IT)

( * ) Notice: Subject to any disclaimer, the term of this patent is extended or adjusted under 35 U.S.C. 154(b) by 0 days.

(21) Appl. No.: 18/862,039

(22) PCT Filed: May 5, 2023

(86) PCT No.: PCT/IB2023/054679
§ 371 (c)(1),
(2) Date: Oct. 31, 2024

(87) PCT Pub. No.: WO2023/214363
PCT Pub. Date: Nov. 9, 2023

(65) Prior Publication Data
US 2025/0179953 A1    Jun. 5, 2025

(30) Foreign Application Priority Data

May 5, 2022   (CN) .......................... 202221068713.8
May 5, 2022   (IT) ......................... 102022000009170

(51) Int. Cl.
*F01N 3/20* (2006.01)
(52) U.S. Cl.
CPC .......... *F01N 3/208* (2013.01); *F01N 2560/06* (2013.01); *F01N 2610/02* (2013.01);
(Continued)

(58) Field of Classification Search
CPC combination set(s) only.
See application file for complete search history.

(56) References Cited

U.S. PATENT DOCUMENTS 9,732,653 B2 *   8/2017   Ogawa ................. F01N 3/2066
10,738,675 B2 *  8/2020   De Cesare ............. F01N 3/206
(Continued)

FOREIGN PATENT DOCUMENTS

KR       20130066834 A      6/2013
WO       2018065912 A1      4/2018

OTHER PUBLICATIONS

International Search Report and Written Opinion for International Application No. PCT/IB2023/054679 mailed Jun. 19, 2023.

*Primary Examiner* — Binh Q Tran
(74) *Attorney, Agent, or Firm* — Dorsey & Whitney LLP

(57) ABSTRACT

Sender unit for conveying a solution of urea into a vehicle, comprising an upper portion configured to be inserted in an opening of a tank for the urea solution; the upper portion defines a first and a second orifice adapted to be connected to an inlet pipe and to an outlet pipe forming part of a conditioning circuit; the sender unit further comprises:
  a heat exchange pipe connected to the first and to the second orifice and adapted to be at least partially immersed in the urea solution,
  sensor means for detecting a temperature of the urea solution, and
  an electrical interface unit connected to the sensor means, the electro valve being a three-way two-position valve configured to provide a flow rate of urea solution in a range between 0 and 600 l/h with a pressure drop that varies between 0 and 300 mbar.

15 Claims, 4 Drawing Sheets

(52) U.S. Cl.
CPC .... *F01N 2610/10* (2013.01); *F01N 2610/105* (2013.01); *F01N 2610/11* (2013.01); *F01N 2610/1413* (2013.01); *F01N 2610/142* (2013.01); *F01N 2610/146* (2013.01); *F01N 2610/148* (2013.01); *F01N 2900/1808* (2013.01); *F01N 2900/1811* (2013.01); *F01N 2900/1812* (2013.01); *F01N 2900/1814* (2013.01)

(56) References Cited

U.S. PATENT DOCUMENTS

| | | | | |
|---|---|---|---|---|
| 2007/0079599 | A1* | 4/2007 | Osaku | F01N 3/2066 |
| | | | | 60/301 |
| 2010/0132338 | A1* | 6/2010 | Schmale | F01N 3/208 |
| | | | | 60/287 |
| 2010/0242439 | A1* | 9/2010 | Domon | B01D 53/9431 |
| | | | | 60/274 |
| 2020/0003102 | A1* | 1/2020 | Sekine | F01N 3/2896 |
| 2021/0131334 | A1* | 5/2021 | Stephens | F01P 3/12 |

* cited by examiner

UREA SENDER UNIT

CROSS-REFERENCE TO RELATED APPLICATIONS

This patent application is a U.S. National Stage of PCT International Application No. PCT/IB2023/054679 filed on May 5, 2023, which claims priority to Italian Patent Application No. 102022000009170 filed on May 5, 2022 and Chinese Patent Application no. 202221068713.8 filed on May 5, 2022, the entire disclosure of each of which is incorporated herein by reference.

TECHNICAL FIELD

The invention relates to a sender unit for conveying urea, in particular to a sender unit for conveying urea for an industrial vehicle.

BACKGROUND ART

In order to reduce polluting emissions of Diesel engines, an emission reduction technique is used, which is known as "selective catalytic reduction" or SCR. This technique is based on the injection, into the flow of burnt gases, of a urea-based solution, which, through a chemical reaction, transforms nitrogen oxides into nitrogen and water in an elementary gaseous state, thus significantly reducing the level of pollutants in Diesel engines. This urea solution, usually known as ADBLUE®, is normally contained in a dedicated tank of the vehicle.

The urea solution is conveyed into the exhaust gas flow by means of a distribution circuit and, in order to control the temperature of the urea solution, it is kept at a controlled temperature level by means of a conditioning circuit.

In order to do so, urea sender units are used, which are partially inserted in the urea containing tanks and are basically configured to enable the withdrawal and the conditioning of the urea contained in the tank, in particular so as to prevent it from freezing.

In particular, the conditioning circuit usually comprises an electrovalve, which allows a conditioning fluid of the conditioning circuit to flow inside an urea sender unit and is controlled by the control unit of the vehicle based on the information coming from a temperature sensor, which is located in the tank of the urea solution.

This electrovalve is usually installed on the frame of the vehicle by means of a bracket and is connected to the control unit of the vehicle by means of a dedicated wiring. Furthermore, the fluidic connection between the electrovalve and the conditioning circuit is ensured by specific connection pipes.

However, due to the presence of the bracket, of the dedicated wiring and of the connection pipes, this configuration of the conditioning circuit takes up a lot of space and is expensive.

Therefore, there is the need to provide urea conditioning circuits that are small and economic.

The object of the invention is to solve the technical problem described above.

DISCLOSURE OF INVENTION

In order to do so, the invention provides a urea sender unit according to the appended set of claims.

BRIEF DESCRIPTION OF THE DRAWINGS

The invention will be best understood upon perusal of the following detailed description of a preferred embodiment, which is provided by way of non-limiting example, with reference to the accompanying drawings, wherein.

BEST MODE FOR CARRYING OUT THE INVENTION

Figure 1:
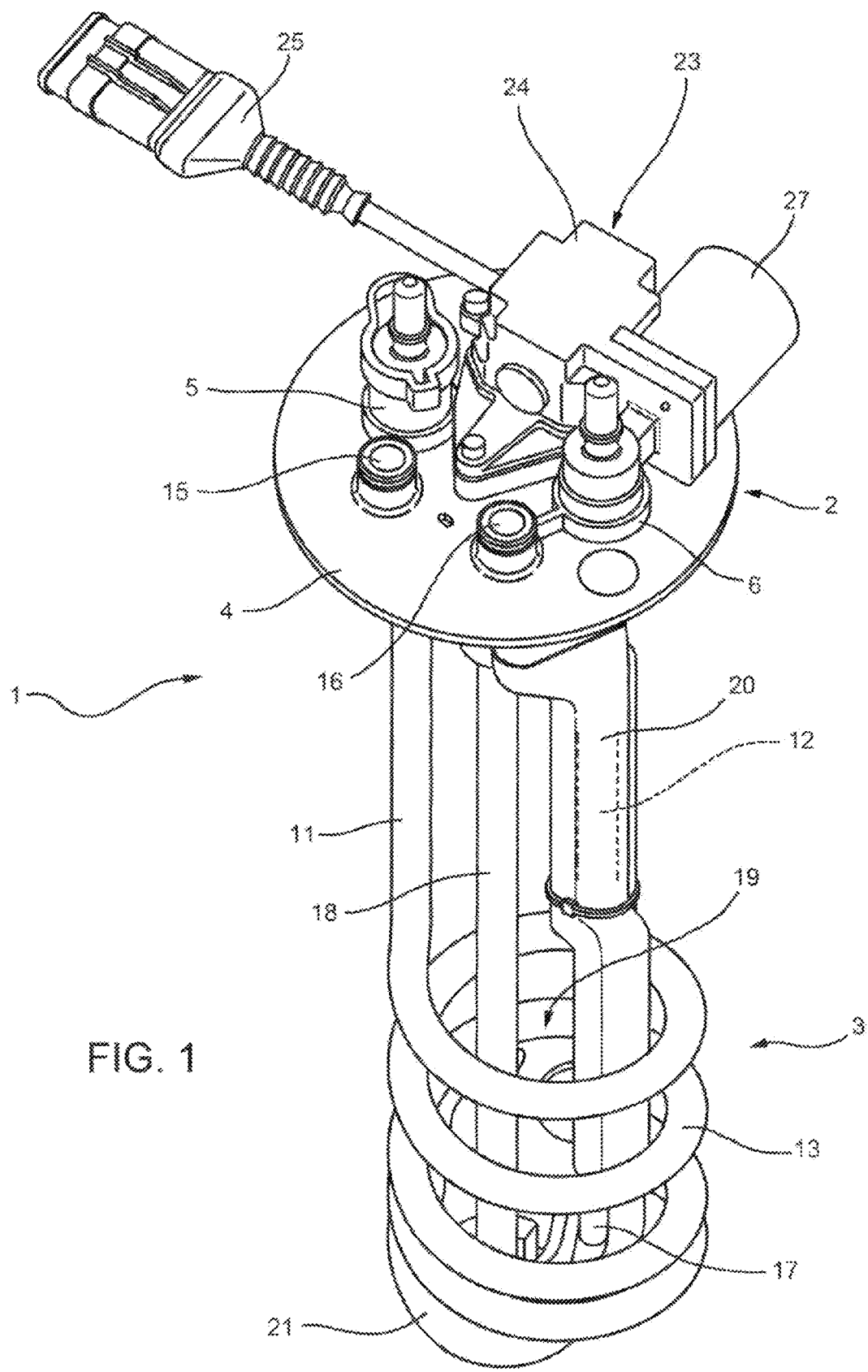
FIG. 1 is a perspective view of a urea sender unit according to the invention, with parts removed for sake of clarity.
Figure 2:
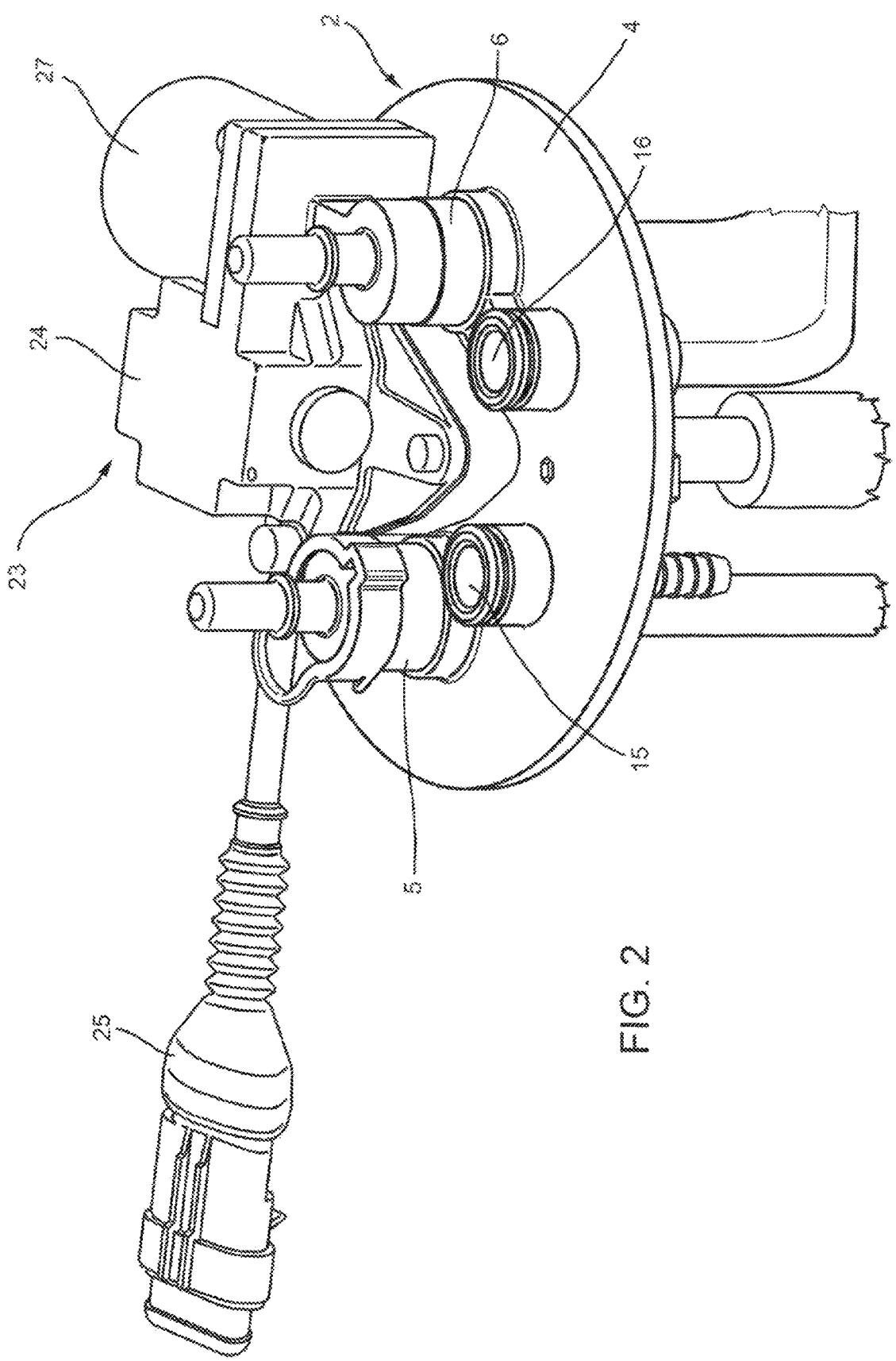
FIG. 2 is an enlarged perspective view of an upper portion of the unit of FIG. 1.

FIG. 1 shows a urea sender unit 1 basically comprising a head 2, which is configured to be inserted into an opening with a complementary shape of a urea tank (tank shown) in a vehicle, and a heat exchange pipe 3, which is part of a urea conditioning circuit 100, which axially extends under the head 2.

The head 2 substantially has a circular shape and basically comprises a disc 4, in which a first orifice 5 and a second orifice 6 are obtained, which extend through the disc 4. The orifices 5 and 6 are configured to be connected, under the disc 4, to the heat exchange pipe 3 and, above the disc 4, to the urea solution conditioning circuit 100, as described more in detail hereinafter.

The heat exchange pipe 3 basically comprises a pair of vertical segments 11, 12 and a coil 13. Preferably, the first vertical segment 11 is connected to the first orifice 5 and the second vertical segment 12 is connected to the second orifice 6, whereas the coil 13 is connected, at its end, to the first segment 11 and to the second segment 12, respectively, and axially extends away from the head 2.

Furthermore, on the disc 4 there are two further orifices, a third orifice 15 and a fourth orifice 16, which are both configured to be connected, above the head 2, to respective supply and withdrawal ducts of a urea distribution circuit (not shown). The fourth orifice 16 is further configured to be connected, under the head 2, to an a suction duct 17 to suck the urea solution contained in the tank of the vehicle.

Preferably, the duct 17 axially extends from the head 2 into a substantially cylindrical volume 19, which is delimited by the loops of the coil 13. More preferably, the duct 17 is housed inside a polymer material jacket 20, which wraps it together with the vertical segment 12 of the heat exchange pipe 3.

The volume 19 further houses, in a lower and substantially terminal position of the unit 1, a damper 21 with a cylindrical shape, which is configured to fulfil different functions. First of all, the damper 21 acts as a dynamic damper for the entire urea sender unit 1; secondly, it acts as a filter for the suction pipe 17; finally, it acts as a support for sensor means.

The sensor means can comprise, for example, a temperature sensor, a concentration sensor or a level sensor 18 for the urea solution. In the embodiment shown, the temperature sensor and the concentration sensor are not shown and are preferably located at the bottom of the damper 21.

The level sensor 18 is known and substantially comprises a pipe axially extending from the damper 21 to the head 2.

The urea sender unit 1 further comprises an electrical interface unit 23, which is housed on the head 2 and basically comprises an electrical unit 24, which is designed to convey the signals coming from the sensor means, and a connector 25, which is configured to connect the electrical unit 24 to a control unit (not shown) of the vehicle. The electrical interface unit 23 may be electrically connected to an electrovalve 27, which is fixed on the disc 4 close to the orifice 6.

In such case, the electrical unit 24 comprises electronic means, which are configured to directly process the signals coming from the sensor means and to control the electro valve 27, thus not going through the control unit of the vehicle.

In particular, the electro valve 27 is a three-way two-position valve and is configured to selectively allow the conditioning fluid to flow inside the heat exchange pipe 3 through the orifice 6 or inside a bypass pipe of the conditioning circuit 100, s described more in detail hereinafter.

In particular, the electro valve 27 is configured to provide a flow rate of urea solution in a range between 0 and 600 l/h with a pressure drop that varies between 0 and 300 mbar.

Figure 4:
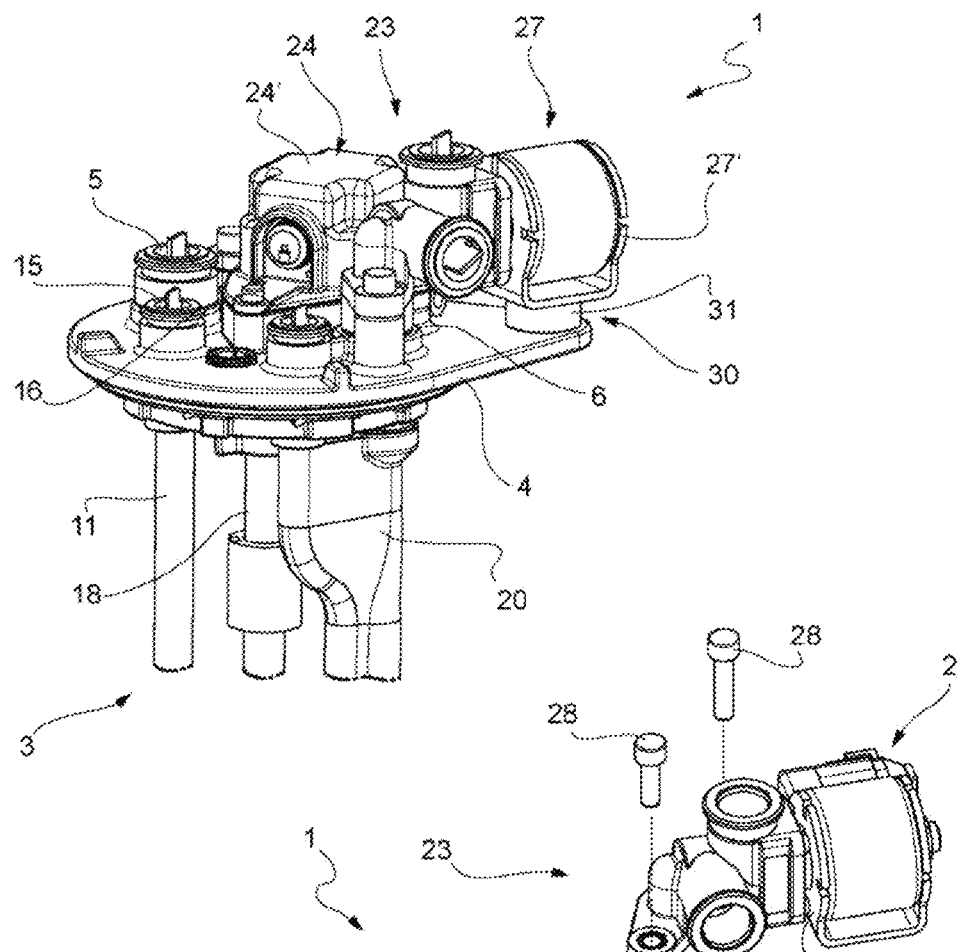
FIG. 4 is a perspective view of the urea sender unit according to a further embodiment of the invention.
Figure 5:
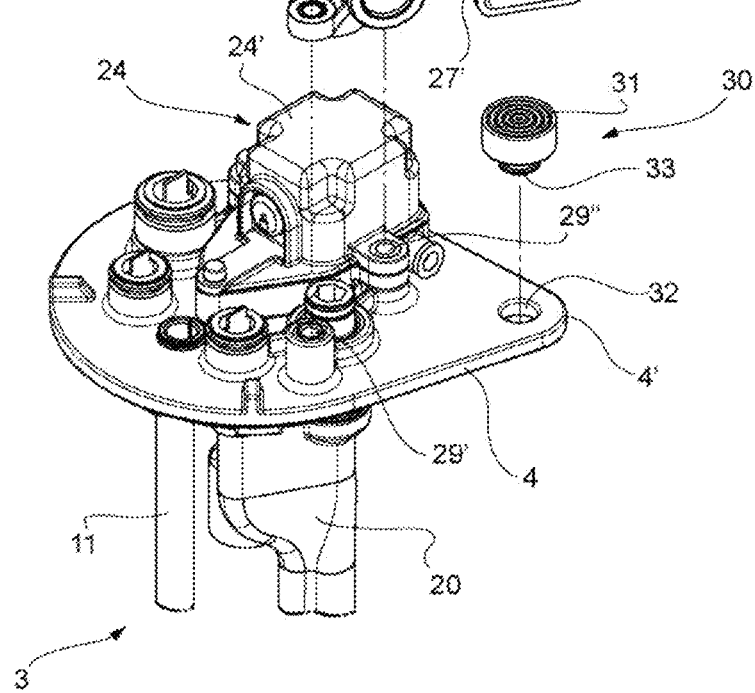
FIG. 5 is a partially exploded view of the urea sender unit of FIG. 4.

Making reference to FIGS. 4 and 5, it is provided a further embodiment of the sender unit 1.

In such embodiment, the electro-valve 27 is provided with a housing 27' that is separated to the housing 24' of the control unit 24 and circumferentially spaced with respect longitudinal axis of sender unit 1.

In particular, housing 27 is fixable to disc 4 via a pair of fixing means e.g. a pair of threaded elements 28, such as screws. In detail, each threaded element 28 is configured to engage a seat 29', 29". In detail, seats 29', 29" are placed opposite one with respect to the other on lateral sides of second orifice 6.

In particular, a first seat 29' is directly realized on plate 4, while a second seat 29" is realized on plate 4 via housing 24' of control unit 24.

Moreover, while housing 24' of the control unit 24 is directly in contact with plate 24, the housing 27' is not in direct contact with disc 4, i.e. is carried in a cantilevered way with respect to disc 4, in other words it is carried above this latter along the longitudinal direction of the sender unit 1.

In detail, the sender unit 1 comprises dampening means 30 operatively interposed between the disc 4 and the electro valve 27 to allow dampening of vibration due to operation of the electro valve to the other elements of the sender unit 1.

Preferably, disc 4 defines an appendix 4' radially extending from the circular portion of disc 4 and voted to provide support to dampening means 30 that cooperates therefore by contact, along sender unit longitudinal direction, with the housing 27' of electro valve 27.

Figure 3:
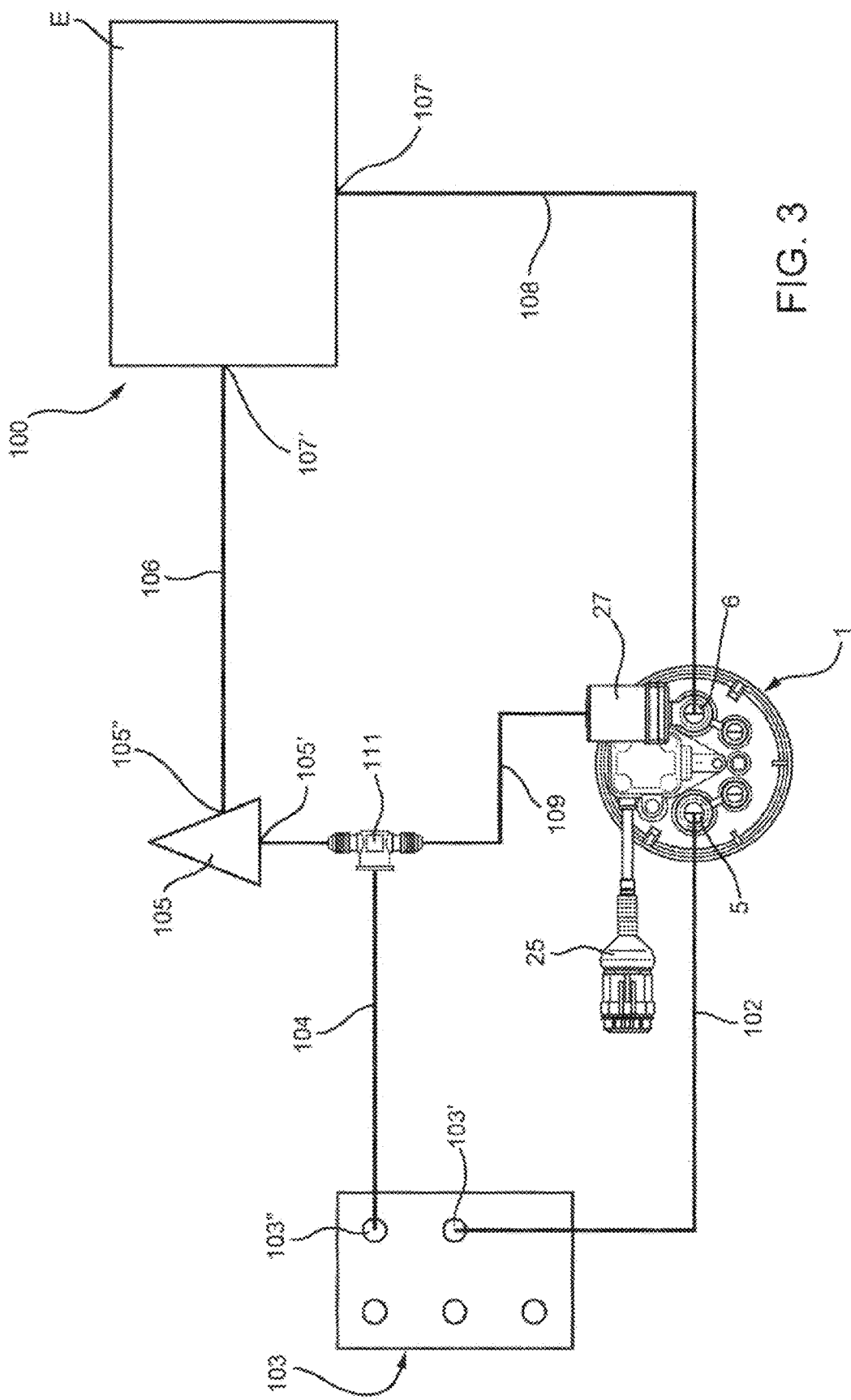
FIG. 3 is a diagram showing a urea conditioning circuit comprising a urea sender unit according to the invention.

In detail, dampening means 30 comprise a damping pad 31, preferably realized as a plug and more preferably in polymeric material, such as rubber. In particular, the damping pad 31 is carried by the appendix 4' of disk 4 via a shape coupling, e.g. realized by the coupling of an appending 33 extending from the damping pad 31 and a seat 32 realized on the appendix 4' of the disk 4. FIG. 3 shows, in a schematic manner, the conditioning circuit 100 for the urea solution, which comprises a urea sender unit 1 of the type described above.

The orifice 5 of the sender unit 1 is connected, through a pipe 102, to an inlet 103' of a pumping module 103. The pumping module 103 is configured to enable the recirculation of the conditioning fluid inside the conditioning circuit 100.

An outlet 103" of the pumping module 103 is connected, through a pipe 104, to an inlet 105' of a an injecting module 105.

The injecting module 105 is fluidically connected to the orifice 16, by means of dedicated and not shown pipes, and is configured to inject the urea solution into the exhaust gas circuit.

An outlet 105" of the injecting module 105 is connected, by means of a pipe 106, to an inlet 107' of an internal combustion engine E. Preferably, the inlet 107' is the inlet of a cooling circuit of the internal combustion engine E.

An outlet 107" of the internal combustion engine E is connected, by means of a pipe 108, to the orifice 5 of the urea sender unit 1. On the pipe 108, upstream of the orifice 6 following the flow of the conditioning fluid, there is the electrovalve 27 carried by the urea sender unit 1, which selectively allows the conditioning fluid to flow into the heat exchange pipe 3 of the unit 1 through the orifice 6.

The bypass pipe 109 is directly connected to the solenoid valve 27, which is configured to selectively permit the passage of the fluid in the heat exchange pipe 3 and directly into the bypass pipe 109. Therefore, there is only one simple three-way union 111, which connects the bypass pipe 109 to the pipe 104.

The operation of the sender unit 1 according to the invention as described above works as follows.

Preferably, the conditioning fluid for the urea solution is the cooling fluid of an internal combustion engine E.

The signals coming from the sensor means are sent to the vehicle/motor ECU or, if so, to the electrical unit 24 in order to be processed to control the electro valve 27.

In a first operating condition, the electro valve 27 enables the flow of a part of the conditioning fluid coming from the internal combustion engine E in the heat exchange pipe 3. By so doing, the conditioning fluid heats the urea solution contained in the tank during its path in the heat exchange pipe between the orifice 6 and the orifice 5.

From the pumping module 103, the conditioning fluid flows towards the injecting module 105, which, as it is arranged on the exhaust gas duct, has a high temperature. The conditioning fluid, after having cooled down during the heating of the urea solution or even not passing therein, cools down the injecting module 105, thus heating up in turn.

From the injecting module 105, the fluid flows inside the internal combustion engine E exchanging heat with it and further heating up. From the internal combustion engine E, the heated fluid can start another urea solution conditioning cycle, as already described above.

At the same time, another part of the conditioning fluid flows in the bypass pipe 109 between the pipe 108 and the injecting module 105.

In a second operating condition, the electro valve 27 does not allow the conditioning fluid to flow in the heat exchange pipe 3 and, therefore, the fluid circulates between the pipes 106, 108 and the bypass pipe 109, exclusively exchanging heat with the injecting nodule 105 and the internal combustion engine E.

The operation of the second embodiment of the sender unit is similar. In particular, the dampening means allows to dampen the vibrations produced by electro-valve 27 during its operation or transmitted by the vehicle to the urea sender unit.

The features described above reveal the advantages of a urea sender unit 1 according to the invention and of a urea conditioning circuit 100 comprising said unit.

The urea sender unit 1, as it is provided with an integrated electrovalve 27, allows manufacturers to produce a conditioning circuit 100 with smaller dimensions and which needs less pipes and wiring for the urea sender unit.

Therefore, the conditioning circuit 100 is economic, small-sized and easy to be manufactured.

In particular, the proposed operative range allow to use the urea sender unit to a wide range of vehicles.

Moreover, the presence of separate housings for the electro valve and the control unit allows to make easier the maintenance of the electro-valve without exposing the control unit to environment.

The presence of dampening means allows to avoid that vibrations due to activations of the electro-valve and of the vehicle may worst tightness of the conduits coupling or provide damages to mechanical components/couplings after long uses of the sender unit.

The presence of the projection and the proposed coupling of the electro-valve allows a disposition of the elements of the sender unit that is compact and make easier the mounting of each component.

Finally, the urea sender unit 1 described and shown herein can be subjected to changes and variants, which do not go beyond the scope of protection set forth in the appended claims.

For example, the urea sender unit 1 could contain further sensors or not contain any one of the sensors described herein.

The invention claimed is:

1. A sender unit for conveying a solution of urea into a vehicle, the sender unit comprising:
    an upper portion configured to be inserted in an opening of a tank for said urea solution, said upper portion defining a first and a second orifice adapted to be connected to an inlet pipe and to an outlet pipe forming part of a conditioning circuit;
    a heat exchange pipe connected to the first and to the second orifice and adapted to be at least partially immersed in said urea solution;
    sensor means adapted to detect a temperature of said urea solution, and
    an electrical interface unit connected to said sensor means and configured to exchange electrical signals with an external electronic unit; and
    an electro valve carried by said upper portion and connected to said interface unit and configured to control the flow of said conditioning fluid in said conditioning circuit;
    wherein said electro valve is a three-way two-position valve configured to provide a flow rate of urea solution in a range between 0 and 600 l/h with a pressure drop that varies between 0 and 300 mbar.

2. The sender unit of claim 1, wherein said conditioning fluid is a cooling fluid for cooling the engine of said vehicle.

3. The sender unit of claim 1, wherein said heat exchange pipe comprises a coil.

4. The sender unit of claim 1, wherein said sensor means are adapted to detect the concentration of said urea solution.

5. The sender unit of claim 1, wherein said sensor means are adapted to detect the level of said solution in said tank.

6. The sender unit of claim 1, further comprising a supply duct and a withdrawal duct for said urea solution which pass through said upper portion.

7. The sender unit of claim 1, wherein said interface unit is housed in a housing fixedly carried by said upper portion and said electro valve comprise a housing fixedly carried by said upper portion, said housings of said electro-valve being separated with respect to the housing of said interface unit.

8. The sender unit of claim 7, wherein said housing of said electro valve is fixedly carried to said upper portion via a pair of fixing means configured to be coupled within a pair of seats carried by said upper portion.

9. The sender unit of claim 8, wherein said pair of seats are arranged laterally opposite one to the other with respect to one between said first and second orifices.

10. The sender unit of claim 7, wherein said upper portion comprises a disk element said housing of said electro-valve is carried cantilevered above said disk element.

11. The sender unit of claim 10, wherein said disk element comprises a projection extending radially with respect to a longitudinal axis of said sender unit, said electro-valve being carried above said projection along the longitudinal axis direction.

12. The sender unit of claim 10, further comprising dampening means operatively interposed between said housing of said electro-valve and said disk.

13. The sender unit of claim 12, wherein said dampening means comprise a plug fixedly carried by said disk and cooperating in contact with said housing of said electro-valve.

14. The sender unit of claim 12, wherein said plug is made in polymeric material.

15. The sender unit of claim 10,
    wherein said disk element comprises a projection extending radially with respect to a longitudinal axis of said sender unit, said electro-valve being carried above said projection along the longitudinal axis direction,
    wherein said plug is fixedly carried by said projection.

* * * * *